United States Patent [19]

Harrison

[11] 4,437,482
[45] Mar. 20, 1984

[54] WATER-SENSITIVE PROBE VALVE FOR USE WITH A GAS LEAK DETECTOR

[76] Inventor: Loren C. Harrison, 8607 Danby Ave., Whittier, Calif. 90606

[21] Appl. No.: 421,146

[22] Filed: Sep. 22, 1982

[51] Int. Cl.³ ............................................. F16K 13/04
[52] U.S. Cl. ....................................... 137/67; 137/559
[58] Field of Search ................... 137/67, 559; 73/23, 73/40.5 R

[56] References Cited

U.S. PATENT DOCUMENTS 3,920,031  11/1975  Maxfield ............................... 137/67
4,294,276  10/1981  Harrison ............................... 137/67

Primary Examiner—Harold W. Weakley
Attorney, Agent, or Firm—Christie, Parker & Hale

[57] ABSTRACT

A water sensitive cutoff valve shuts off upon detecting water to protect a gas leak detector. A transparent case threads into a base and houses a normally open valve mechanism. The valve includes a tapered post with an exit port and a shuttle that is capable of movement along the post to seal or uncover the port. A water-soluble band stretched between a finger mounted on the post and a second finger mounted on the shuttle holds the valve open against the bias of a spring that acts between the shuttle and the post. The presence of water dissolves the band and frees the shuttle to close under the bias of the spring and prevent water from entering and damaging the gas leak indicator. The base has an inlet port for a gas probe, a passage into the case, and an exit port to the gas leak detector. The passage into the case includes a tube extending into the case with an exit in close proximity to the band.

15 Claims, 3 Drawing Figures

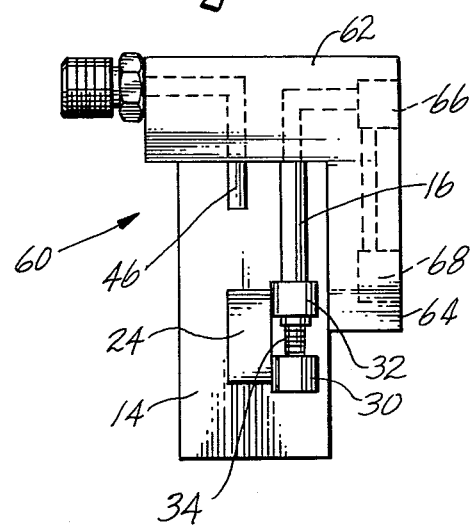
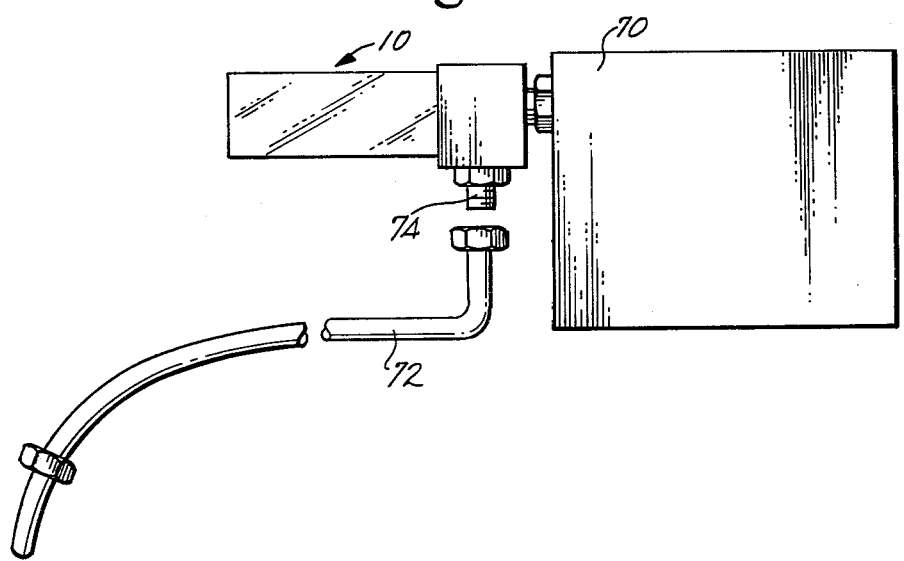

WATER-SENSITIVE PROBE VALVE FOR USE WITH A GAS LEAK DETECTOR

BACKGROUND OF THE INVENTION

The present invention relates in general to gas leak detectors, and, in particular to a water-sensitive cutoff valve that automatically closes a path to a gas indicator upon sensing the presence of water to protect the indicator.

Handheld gas leak detectors or gas indicators are used to detect leaks from gas mains and the like. Water can damage the gas indicator. Typically, a probe on a flexible line to the gas indicator is used to get access to the zone being tested. Water can be drawn up to the gas indicator through the probe and cause damage.

It is highly desirable, then, to provide some means to prevent water from entering the gas indicator and damaging that indicator.

Water-soluble devices have been used as safeties to close a passage when water is present, but these devices are awkward to use and arm. U.S. Pat. No. 3,472,253 to Herscher et al discloses a water detector and valve shutoff that uses a spacing element loaded in compression by a valve element. The element fails when soaked in water. A nut must be removed and an entire assembly broken down to rearm the device. U.S. Pat. No. 2,798,503 to Carver et al discloses a tension loaded water-soluble link only as a safety shutoff for hot water heaters. The safety is remote from the valve.

U.S. Pat. No. 4,294,276 to Loren C. Harrison discloses a water-sensitive probe valve that houses a normally open valve mechanism in a barrel and a cap. The Harrison device is an improvement over those just discussed. The valve is held open by a water-soluble link secured between anchors, one on the valve element and one on a statinary part of the probe. Water weakens the band and it fails, closing the valve element and protecting the gas indicator. Access to the band for rearming is easy; the cap is merely taken off the barrel. Rearming is easy because there is a lock that keeps the valve open. It is sometimes preferred to have the water-sensitive shutoff valve out of the way of the gas probe, mounted to the gas detector, for example. It is advantageous, of course, to have the shutoff valve of simple construction, reliable in performance, and easily serviced and rearmed.

SUMMARY OF THE INVENTION

The present invention provides a water-sensitive cutoff valve with a water-soluble link that holds a valve mechanism open until water is detected, whereupon the valve mechanism closes. A base mounts a post which in turn mounts a displaceable shuttle. An exit port in the post is capable of being masked or unmasked, depending on the position of the shuttle on the post, and leads to an outlet port in the base. A spring acting between the post and the shuttle normally biases the shuttle into a closed position to prevent the flow of gas out the port. The water-soluble band acts between the post and the shuttle to keep the exit port unmasked. A case attaches to the base in a manner for easy removal, as by threading, and houses the valve mechanism and seals it from the environment. An inlet through the base and into the case completes the gas circuit through the valve. The base has means for attachment to a gas probe at the inlet. The base also has means for passing gas from the outlet port into a gas detector.

In preferred form, the present invention has a base with a tapered post attached to the base. An axial passage in the post communicates a radial exit port to an outlet passage of the base that leads to a gas indicator. A shuttle with a tapered bore complementary to the taper of the post mounts on the post for movement along it between an open position unmasking the exit port and a closed position masking and closing the exit port. The water-soluble band acts between the post and the shuttle to keep the shuttle in its open position against a closing bias of a compression spring acting between the shuttle and the post. For this purpose an upper band support finger extends from a head secured to the post, as by threads, and a lower band support finger extends from a collar that receives the shuttle, as by a press fit. The band fits over the two fingers. A flange on the shuttle extends over an end of the collar facing the head to index the collar and the shuttle. A transparent case houses and seals these mechanisms. An upstanding stem from the inlet of the base connects the inside of the case to a zone being sampled by a sampling probe. The outlet of the stem may be aligned with the band to direct sample gas directly onto the band. The base has an outlet port for communication with the exit port for the passage of gas into a gas indicator.

The cutoff valve is readily armed with a water-soluble link by merely approximating the band support fingers and slipping a band over the fingers. The valve's construction is simple in its use of a post that mounts the shuttle and the water-soluble band mechanism and the compression spring. With the transparent case, the state of the environment within the case can be viewed to see if there is water there or if the band has broken.

These and other features, aspects and advantages of the present invention will become more apparent from the following description, appended claims and drawings.

BRIEF DESCRIPTION OF THE FIGURES

FIG. 2 is an elevational view of another preferred form of the present invention; and FIG. 3 is a view showing the use of the cutoff valve with a gas detecting probe and a gas detector.

DESCRIPTION OF THE PREFERRED EMBODIMENTS

Figure 1:
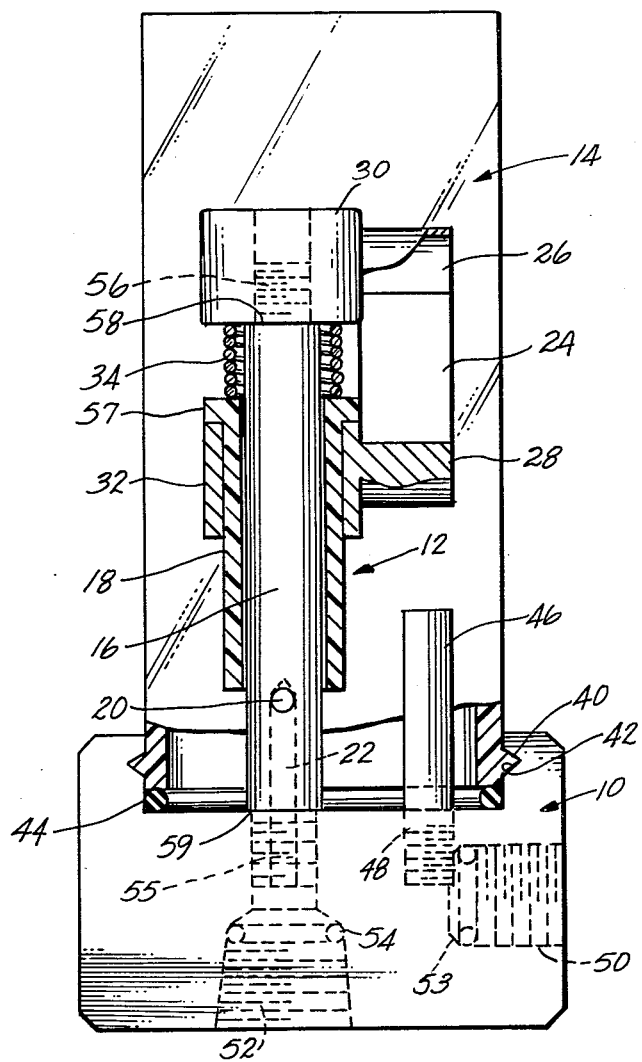
FIG. 1 is a view in elevation, partly in half section and partly broken away, of one preferred form of the cutoff valve of the present invention.

With reference to FIG. 1, the cutoff valve of the present invention includes a base 10, a valve mechanism 12, and a case 14.

The valve assembly includes a post or stem 16 secured to base 10. A shuttle 18 is mounted on post 16 for axial movement along it, between an open and a closed position. An exit port 20 in the post leads to an axial passage 22 to pass gas into cooperating passages in the base. A water-soluble, continuous band 24 mounts over an upper finger 26 and a lower finger 28 and keeps the shuttle in the upward, open position shown in FIG. 1.

Finger 26 extends laterally of a cylindrical head 30. Head 30 mounts on an upper, free end of post 16. Lower finger 28 extends laterally from a cylindrical collar 32 that is received over post 16 and shuttle 18.

A compression spring 34 is received on post 16 above shuttle 18 and acts between head 30 and shuttle 18 to urge the shuttle downwardly towards the closed position.

Because finger 26 is mounted to head 30, which in turn is secured to the post, and finger 28 is mounted to shuttle 18, the tendency of the compression spring to force the shuttle downwardly to mask and close port 20 is resisted by tension in the water-soluble band 24. When that band becomes wet, its strength lessens and it fails, freeing the shuttle to the spring and permitting the closure of port 20 by the shuttle.

Case 14 has external threads 40 received in complementary threads 42 of base 10. Threads 42 are in a recess of the base. An O-ring 44 at the end of the recess acts between the base and the open end of the case to effect a seal. The case is preferably transparent for an operator to observe valve mechanism 12 and the state within the case.

Base 10 includes an upstanding stem 46 secured by threads at 48 into the base. The stem opens into the interior of case 14 proximate water-soluble band 24.

The base has an inlet 50 adapted to receive a fitting for a probe used in detecting the presence of gas. The inlet opens into a threaded bore 48 to communicate the probe with the interior of the case. An outlet 52 opens into axial passage 22 to permit gas to flow out of the device and into a gas detector. A first O-ring 54 and a second 0-ring 56 in the bottom of outlet 52 and inlet 50 effect a seal between fittings used with these passages and the base. The base may be plastic.

Post 16 has a threaded extension 55 of reduced diameter that threads into complementary female threads in the base. Axial passage 22 extends through this threaded section into a complementary passage in the base. At its free end, the post has a male threaded section 53 that threads into complementary threads of head 30.

Post 16 may be a standard, tapered pin, say a No. 3 tapered pin, and shuttle 18 has a complementary internal taper to effect closure on port 20 when band 24 fails.

Collar 32 receives shuttle 18 by a force fit. An external flange 57 at the top of the shuttle indexes the shuttle with respect to the collar. Preferably the shuttle is formed of a plastic material such as Delrin.

Head 30 seats on a radial shoulder 58 at the top of the post which indexes the collar with respect to port 20. The post has a second radial shoulder 59 that abuts base 10 and indexes the post with respect to the base.

FIG. 2 shows a modified version of a cutoff valve 60 of the present invention. It is much the same as that just described, with the exception that the base is altered. A base 62 formed of, say, aliminum, has a right angle extension 64. The extension has two outlet ports 66 and 68 to permit a choice in where the valve is connected to a gas detector, only one of the outlets being used at a time, with the other being closed by a threaded plug. FIG. 2 shows valve mechanism 12 with no section; the cylindrical shape of head 30 and collar 32 can be seen as well as the fact that band 24 is continuous.

If desired, stem 46 can extend further into the case and closer to the band to direct sample gas onto the band from a closer position.

It is also possible to arrange the supporting geometry of the base differently from that illustrated. For example, it is possible to have the inlet and exit of the base aligned. It is also possible to adapt the device for various types of fittings or attachments.

FIG. 3 illustrates the device as it would be used. There, a gas detector 70 is downstream of cutoff valve 10. A probe 72 of a hose and a female fitting attaches to a male fitting 74 that threads into inlet 50 of the base.

In use, an operator with the cutoff valve secures it to a gas detector and connects a probe to the inlet port of the base. In the event of water in a sample of gas, the water-soluble band 24 will weaken and break. Spring 34 then forces shuttle 18 over exit port 20 and closes the port. This closes the exit port area being sampled by the probe to the gas detector. The user may then unthread case 14 from the base and with fingers push shuttle 18 to its most proximate position near head 30 and fit a new band over fingers 26 and 28. The device is then armed and the case can be attached to the base and the device used again.

The present invention has been described with reference to a preferred embodiment. The spirit and scope of the appended claims should not, however, necessarily be limited to the foregoing description.

What is claimed is:

1. A cutoff valve for water-sensitive instruments comprising:
   (a) a base having an inlet and an outlet;
   (b) a case, removably secured to the base;
   (c) a post secured to the base and extending into the case, the post having an exit port in communication with the outlet and opening in the case;
   (d) a shuttle received on the post for translation along it to close the exit port in a closed position and to open the exit port in an open position;
   (e) water-soluble band means;
   (f) a first band support finger secured to the post and adapted to receive the water-soluble band;
   (g) a second band support finger secured to the shuttle and adapted to receive another end of the band; and
   (h) biasing means between the post and the shuttle urging the shuttle to the closed position, the band opposing the spring means and keeping the shuttle in the open position until the band breaks in response to water.

2. The cutoff valve claimed in claim 1 wherein the post is externally tapered and the shuttle has a complementary internal taper such that the shuttle in the closed position seats on the post over the port.

3. The cutoff valve claimed in claim 2 including:
   a head, the first band support finger extending from the head and the head being mounted on one end of the post; and
   a collar receiving the shuttle, the second band support finger extending from the collar.

4. The cutoff valve claimed in claim 3 wherein the case is transparent.

5. The cutoff valve claimed in claim 4 wherein the biasing means includes a compression spring acting between the head and the shuttle.

6. The cutoff valve claimed in claim 1 including an inlet stem from the base into the case in communication with the inlet and with an exit proximate the water-soluble band.

7. The cutoff valve claimed in claim 6 wherein the post is externally tapered and the shuttle has a complementary internal taper such that the shuttle in the closed position seats on the post over the port.

8. The cutoff valve claimed in claim 7 wherein:
   a head, the first band support finger extending from the head and the head being mounted on one end of the post; and a collar receiving the shuttle, the second band support finger extending from the collar.

9. The cutoff valve claimed in claim 4 wherein the base includes an internally threaded recess, the case has a complementary male thread, and including an O-ring in the recess for engaging the proximate end of the case and effecting a seal, 10. The cutoff valve claimed in claim 3 wherein the post has externally threaded ends of reduced diameter, the post being secured to the base by the threads at one end and the head being secured to the post by the threads at the other end.

11. An improved cutoff valve to prevent water from reaching a gas detector, the cutoff valve being adapted to be placed in series between the inlet of the gas detector and a sampling probe, the improvement comprising:
(a) a valve assembly including an externally tapered post, an axial passage in the post, a radial exit port opening into the passage and to the outside of the post, a shuttle having an interior taper complementing that of the post and adapted in a closed position to seal the exit port and in an open position to open the port, a first band support finger extending laterally from and secured to the post, a second band support finger extending laterally from and secured to the shuttle and aligned with the first support finger, a water-soluble band mounted on the first and second fingers and keeping the shuttle in the open position, and biasing means between the post and the shuttle to bias the shuttle towards the closed position, the water-soluble band maintaining the valve normally open by keeping the shuttle free of the exit port but upon being wetted failing to free the shuttle to the biasing means and to move the shuttle in response to such means into the closed position;
(b) a base having an inlet and an exit for the introduction of sample gas into the zone of the valve mechanism and for exiting such gas from that zone and into the gas detection instrument; and
(c) a case removably secured to the base and housing the valve mechanism, the case and the base effecting a seal of the valve mechanism.

12. The improvement claimed in claim 11 including:
a head mounted on the post, the first band support finger extending laterally from the head; and
a collar secured to the shuttle, the second band support finger extending laterally from the collar.

13. The improvement claimed in claim 11 wherein the shuttle is formed of plastic and the post is formed of metal.

14. The improvement claimed in claim 12 wherein the biasing means includes a compression spring acting on the shuttle and the head.

15. The improvement claimed in claim 14 including an inlet stem extending from the base into the case and having an exit in close proximity to the band, the inlet stem being in communication with the inlet.

* * * * *